(12) United States Patent
Kato

(10) Patent No.: US 7,478,072 B2
(45) Date of Patent: Jan. 13, 2009

(54) INFORMATION TERMINAL DEVICE, OPERATION SUPPORTING METHOD, AND OPERATION SUPPORTING PROGRAM

(75) Inventor: Kazuomi Kato, Otsu (JP)

(73) Assignee: Panasonic Corporation, Osaka (JP)

( * ) Notice: Subject to any disclaimer, the term of this patent is extended or adjusted under 35 U.S.C. 154(b) by 703 days.

(21) Appl. No.: 10/680,242

(22) Filed: Oct. 8, 2003

(65) Prior Publication Data
US 2004/0070591 A1 Apr. 15, 2004

(30) Foreign Application Priority Data
Oct. 9, 2002 (JP) .............................. 2002-296230

(51) Int. Cl.
*G06F 17/00* (2006.01)
*G06F 17/20* (2006.01)
(52) U.S. Cl. .............................. 706/11; 706/10; 706/47
(58) Field of Classification Search ................... 706/10, 706/11, 47; 703/22; 709/203
See application file for complete search history.

(56) References Cited

U.S. PATENT DOCUMENTS

| | | | | |
|---|---|---|---|---|
| 5,239,617 A | * | 8/1993 | Gardner et al. ................. | 706/11 |
| 5,390,281 A | * | 2/1995 | Luciw et al. ................... | 706/11 |
| 5,552,806 A | * | 9/1996 | Lenchik ........................ | 345/156 |
| 5,727,129 A | * | 3/1998 | Barrett et al. ................. | 706/10 |
| 5,802,292 A | * | 9/1998 | Mogul .......................... | 709/203 |
| 5,832,231 A | * | 11/1998 | Raman et al. ................ | 709/234 |
| 5,867,226 A | * | 2/1999 | Wehmeyer et al. ............ | 725/46 |
| 6,067,565 A | * | 5/2000 | Horvitz ....................... | 709/218 |
| 6,076,174 A | * | 6/2000 | Freund ........................ | 714/47 |
| 6,078,740 A | * | 6/2000 | DeTreville ................... | 703/22 |
| 6,131,110 A | * | 10/2000 | Bates et al. ................. | 709/203 |
| 6,154,767 A | * | 11/2000 | Altschuler et al. .......... | 709/203 |
| 6,216,098 B1 | * | 4/2001 | Clancey et al. ................. | 703/6 |
| 6,260,035 B1 | * | 7/2001 | Horvitz et al. ................ | 706/60 |
| 6,310,630 B1 | * | 10/2001 | Kulkarni et al. ............. | 715/776 |
| 6,353,444 B1 | * | 3/2002 | Katta et al. .................. | 715/716 |
| 6,826,552 B1 | * | 11/2004 | Grosser et al. ................ | 706/47 |
| 2004/0111748 A1 | * | 6/2004 | Bushey et al. ................. | 725/87 |
| 2004/0111750 A1 | * | 6/2004 | Stuckman et al. ............. | 725/89 |

FOREIGN PATENT DOCUMENTS

| | | |
|---|---|---|
| CN | 1235298 A | 11/1999 |
| EP | 0808049 A2 | 11/1997 |

(Continued)

*Primary Examiner*—Joseph P Hirl
(74) *Attorney, Agent, or Firm*—Wenderoth, Lind & Ponack, L.L.P.

(57) ABSTRACT

An information terminal device and an operation supporting method for enhancing operability by anticipating, based on a history of previous operations performed by a user, a next operation to be performed after a specific operation input by the user, and supporting a user's operation input based on the anticipation. An operation history storing section stores information about an operation input by the user to an input section. Based on the operation history information, an operation anticipating section anticipates a next operation likely to be executed by the user. An operation supporting section supports execution of a function corresponding to the operation anticipated by the operation anticipating section. In the operation supporting section, an anticipated operation executing section 15 automatically executes the anticipated operation, or a user notification section notifies the user if an operation subsequently input to the input section does not coincide with the anticipated operation.

20 Claims, 12 Drawing Sheets

FOREIGN PATENT DOCUMENTS

| | | |
|---|---|---|
| EP | 0 940 980 A2 | 9/1999 |
| EP | 1006704 A2 | 6/2000 |
| EP | 1031913 A2 | 8/2000 |
| JP | 05-181588 | 7/1993 |
| JP | 08-171443 | 7/1996 |
| JP | 10-149246 | 6/1998 |
| JP | 2001-265809 | 9/2001 |
| JP | 2002-135461 | 5/2002 |

* cited by examiner

FIG. 2

| OPERATION ID | CONCRETE OPERATION |
|---|---|
| game01 | START GAME A |
| game02 | START GAME B |
| mailRead | START MAILER AND READ MAIL |
| mailSend | START MAILER AND SEND MAIL |
| call | MAKE CALL |
| volume00 | SET VOLUME AT LEVEL 0 |
| volume01 | SET VOLUME AT LEVEL 1 |
| volume02 | SET VOLUME AT LEVEL 2 |
| dialLockOn | SET DIAL LOCK ON |
| dialLockOff | SET DIAL LOCK OFF |
| alarm01 | SET ALARM 1 |
| alarm02 | SET ALARM 2 |
| mannerOn | SET MANNER MODE ON |
| mannerOff | SET MANNER MODE OFF |
| secretOn | DISABLE VIEWING OF SPECIFIC CONTENTS OF MEMORY |
| myPhone | DISPLAY MY PHONE NUMBER |
| camera | TAKE PHOTO USING BUILT-IN CAMERA |
| ... | ... |

FIG. 4

| OPERATIONS | NUMBER OF OPERATIONS |
|---|---|
| TOTAL NUMBER OF SINGLE OPERATIONS | 2944 |
| SECOND PREVIOUS OPERATION : mailRead<br>FIRST PREVIOUS OPERATION : dialLockOn<br>ANY FIRST PREVIOUS AUTO OPERATION?: YES (dialLockOn) | |
| <SINGLE OPERATION> | |
| game01 | 32 |
| game02 | 5 |
| mailRead | 553 |
| mailSend | 489 |
| call | 51 |
| volume00 | 89 |
| volume01 | 23 |
| volume02 | 70 |
| dialLockOn | 105 |
| dialLockOff | 105 |
| alarm01 | 29 |
| alarm02 | 3 |
| mannerOn | 202 |
| mannerOff | 201 |
| secretOn | 15 |
| ... | ... |
| <TWO CONSECUTIVE OPERATIONS> | |
| game01 → game02 | 2 |
| game01 → volume00 | 28 |
| game01 → mannerOn | 2 |
| ... | ... |
| mailRead → mailRead | 119 |
| mailRead → mailSend | 158 |
| mailRead → dialLockOn | 75 |
| mailRead → alarm02 | 1 |
| ... | ... |
| <THREE CONSECUTIVE OPERATIONS> | |
| game01 → volume00 → mannerOn | 10 |
| game01 → volume00 → dialLockOn | 8 |
| ... | ... |
| game01 → mannerOn → mailRead | 1 |
| ... | ... |

| CONSECUTIVE OPERATIONS | PROBABILITY |
|---|---|
| TOTAL NUMBER OF SINGLE OPERATIONS | 2944 |
| <TWO CONSECUTIVE OPERATIONS> | |
| P (game02 \| game01) | 0.0625 |
| P (volume00 \| game01) | 0.8750 |
| P (mannerOn \| game01) | 0.0625 |
| ... | ... |
| P (mailRead \| mailRead) | 0.2152 |
| P (mailSend \| mailRead) | 0.2857 |
| P (dialLockOn \| mailRead) | 0.1356 |
| P (alarm02 \| mailRead) | 0.0018 |
| ... | ... |
| <THREE CONSECUTIVE OPERATIONS> | |
| P (mannerOn \| game01 volume00) | 0.3571 |
| P (dialLockOn \| game01 volume00) | 0.2857 |
| ... | ... |
| P (mailRead \| game01 mannerOn) | 0.5000 |
| ... | ... |

FIG. 7

| OPERATION ID | CONCRETE OPERATIONS IN NORMAL TIMES | CONCRETE OPERATIONS WHEN ANTICIPATION IS PERFORMED |
|---|---|---|
| game01 | START GAME A | START GAME A |
| game02 | START GAME B | START GAME B |
| mailRead | START MAILER AND READ MAIL | DISPLAY LIST OF INCOMING MAILS |
| mailSend | START MAILER AND SEND MAIL | DISPLAY MAIL SENDING FORM |
| call | CALL | (NONE) |
| volume00 | SET VOLUME AT LEVEL 0 | SET VOLUME AT LEVEL 0 |
| volume01 | SET VOLUME AT LEVEL 1 | SET VOLUME AT LEVEL 1 |
| volume02 | SET VOLUME AT LEVEL 2 | SET VOLUME AT LEVEL 2 |
| dialLockOn | SET DIAL LOCK ON | SET DIAL LOCK ON |
| dialLockOff | SET DIAL LOCK OFF | SET DIAL LOCK OFF |
| alarm01 | SET ALARM 1 | SET ALARM 1 |
| alarm02 | SET ALARM 2 | SET ALARM 2 |
| mannerOn | SET MANNER MODE ON | SET MANNER MODE ON |
| mannerOff | SET MANNER MODE OFF | SET MANNER MODE OFF |
| secretOn | DISABLE VIEWING OF SPECIFIC CONTENTS OF MEMORY | DISABLE VIEWING OF SPECIFIC CONTENTS OF MEMORY |
| myPhone | DISPLAY MY PHONE NUMBER | DISPLAY MY PHONE NUMBER |
| camera | TAKE PHOTO USING BUILT-IN CAMERA | SET CAMERA STANDBY MODE |
| ... | ... | ... |

FIG. 10

| DATE OF OPERATION 1001 | DAY OF WEEK 1002 | TIME (HOUR:MINUTE:SECOND) 1003 | OPERATION ID 1004 |
|---|---|---|---|
| ... | ... | ... | ... |
| 2002/07/01 | MON. | 09:00:15 | mannerOn |
| 2002/07/01 | MON. | 10:30:28 | mannerOff |
| 2002/07/01 | MON. | 10:35:09 | game01 |
| 2002/07/01 | MON. | 13:50:52 | volume00 |
| 2002/07/01 | MON. | 15:10:22 | volume02 |
| 2002/07/01 | MON. | 19:30:48 | mailRead |
| 2002/07/01 | MON. | 19:34:25 | dialLockOn |
| 2002/07/01 | MON. | 20:39:39 | dialLockOff |
| 2002/07/01 | MON. | 20:40:11 | mailRead |
| 2002/07/01 | MON. | 20:45:34 | dialLockOn |
| 2002/07/01 | MON. | 21:55:39 | dialLockOff |
| 2002/07/01 | MON. | 22:01:19 | game01 |
| 2002/07/01 | MON. | 22:10:53 | volume00 |
| 2002/07/01 | MON. | 22:25:30 | alarm02 |
| 2002/07/02 | TUE. | 09:01:58 | mannerOn |
| 2002/07/02 | TUE. | 10:31:44 | mannerOff |
| 2002/07/02 | TUE. | 15:23:58 | secretOn |
| 2002/07/02 | TUE. | 15:24:03 | myPhone |
| 2002/07/02 | TUE. | 15:49:29 | call |
| ... | ... | ... | ... |
| 2002/07/10 | WED. | 18:25:41 | mailRead |
| 2002/07/10 | WED. | 18:25:42 | dialLockOn (AUTO OPERATION) |
| 2002/07/10 | WED. | 18:26:05 | dialLockOff |

FIG. 11

| CONSECUTIVE OPERATIONS | PROBABILITY |
|---|---|
| TOTAL NUMBER OF SINGLE OPERATIONS | 2944 |
| <TWO CONSECUTIVE OPERATIONS> | |
| ◆22:00~18:00 | |
| P (game02 \| game01) | 0.0625 |
| P (volume00 \| game01) | 0.8437 |
| ◆18:00~22:00 | |
| P (volume00 \| game01) | 0.0313 |
| P (mannerOn \| game01) | 0.0625 |
| ... | ... |
| ◆20:00~15:00 | |
| P (mailRead \| mailRead) | 0.2016 |
| P (mailSend \| mailRead) | 0.2857 |
| P (dialLockOn \| mailRead) | 0.0233 |
| ◆15:00~20:00 | |
| P (mailRead \| mailRead) | 0.0136 |
| P (dialLockOn \| mailRead) | 0.1123 |
| P (alarm02 \| mailRead) | 0.0018 |
| ... | ... |
| <THREE CONSECUTIVE OPERATIONS> | |
| ◆10:00~19:00 | |
| P (mannerOn \| game01 volume00) | 0.1984 |
| P (dialLockOn \| game01 volume00) | 0.2857 |
| ... | ... |
| P (mailRead \| game01 mannerOn) | 0.3070 |
| ... | ... |

Columns labeled 1101 and 1102.

INFORMATION TERMINAL DEVICE, OPERATION SUPPORTING METHOD, AND OPERATION SUPPORTING PROGRAM

BACKGROUND OF THE INVENTION

1. Field of the Invention

The present invention relates to an information terminal device, an operation supporting method, and an operation supporting program. More specifically, the present invention relates to an information terminal device which learns a pattern of operations executed by a user based on history information of operations executed by the user, and supports the user by anticipating a next operation to be executed by the user, an operation supporting method performed by the device, and a program for executing the method.

2. Description of the Background Art

In recent years, information terminal devices such as mobile phones and PDAs have become multifunctional, which makes it necessary for a user to learn various operation processes for fully utilizing all the functions thereof. However, only a portion of those various functions are frequently used by a user, and the same process is repeatedly performed for repeatedly executing the portion of those various functions. Thus, it is convenient if the information terminal device is able to learn a specific operation process or a habitual operation process usually performed by the user, and be able to anticipate a next operation for executing it automatically, or be able to advise the user which operation to do next. However, to the best of the inventor's knowledge, there is at present no conventional technique enabling the information terminal device to anticipate a next operation and execute it automatically, or advise the user which operation to do next. That is, there is no user-friendly information terminal device which is able to automatically set a series of operations unique to the user.

As an indirectly related conventional technique, there are techniques disclosed in Japanese Patent Laid-Open Publication 2002-135461 and Japanese Patent Laid-Open Publication 2001-265809. The former document discloses a technique of selecting only a piece of information required by the user from information stored in a connected server system for storing the piece of information in the information terminal device in order to realize a customized information terminal device. However, the technique disclosed in the former document requires the user to select his/her desired setting from the server system, and does not enable the information terminal device to automatically perform a next operation.

Also, the latter document discloses an information terminal device learning a current time, a current position, and a preference of the user based on a message received from another information terminal device. A technique disclosed in the latter document causes the information terminal device to learn a preference of the user based on spot information on restaurants or tourist resorts, which includes positional information and other related information. The information terminal device, however, does not learn operations of the user. Also, the technique disclosed in the latter document is used for performing a comparison with other users' preferences, and is not used for performing an automatic operation or setting of the information terminal device.

As described above, the conventional information terminal device requires the same operation to be repeatedly performed in order to repeat execution or setting of a certain function. Especially, with regard to small and mobile information terminal devices, priority is given to portability, and therefore operability is sacrificed. As a result, the user has to repeatedly perform complicated and bothersome operations, which is a problem.

SUMMARY OF THE INVENTION

Therefore, an object of the present invention is to provide an information terminal device, an operation supporting method, and an operation supporting program which enhance operability by anticipating, based on a history of operations previously performed by the user, a next operation to be performed after a specific operation input by a user, and supporting a user's operation input based on the anticipation.

The present invention has the following features to attain the object mentioned above.

A first aspect of the present invention is directed to an information terminal device for executing, based on an operation input by a user, a function corresponding to the operation. The information terminal device of the present invention comprises an input section; an operation history storing section; an operation anticipating section; and an anticipated operation supporting section.

The input section inputs an operation required by the user. The operation history storing section stores information about the operation input to the input section, as an operation history. The operation anticipating section anticipates, when the operation is input to the input section, a next operation to be subsequently input by the user, based on operation history information stored in the operation history information storing section. The anticipated operation supporting section supports execution of a function corresponding to the next operation anticipated by the operation anticipating section.

The anticipated operation supporting section may automatically execute the function corresponding to the next operation anticipated by the operation anticipating section, and store information about the executed next operation in the operation history storing section as an operation history. Alternatively, when a new operation is input to the input section, the anticipated operation supporting section may compare the new operation with the next operation anticipated by the operation anticipating section based on the operation input before the new operation, and notify the user if the anticipated next operation is different from the new operation.

Also, the operation history storing section preferably stores the operation history information, which is operation information described in order of operations consecutively performed by the user. Furthermore, the operation history storing section may store the operation history information, which is operation information classified and statistically described in accordance with an item of operations consecutively performed by the user.

The operation anticipating section typically calculates a frequency of a next operation subsequently operated after the operation previously input to the input section, based on the operation history information, and anticipates, based on the calculated frequency, a next operation having a highest probability of being subsequently executed, as a next operation to be input by the user. Here, the operation anticipating section preferably calculates the frequency in consideration of at least one operation subsequently executed before the operation input to the input section. Also, the operation anticipating section preferably calculates the frequency based on the operation history information every time an operation is input to the input section.

In order to make operation anticipation more precise, the user may be allowed to select whether a frequency calculated based on the latest operation history information is used or a previously calculated frequency is used for anticipating a next operation. Also, the operation anticipating section may not anticipate a next operation if the operation history information stored in the operation history storing section is statistically insufficient for anticipating a next operation. Furthermore, the function automatically executed by the anticipated operation supporting section may previously correspond to each next operation to be anticipated by the operation anticipating section.

Furthermore, it is effective for the operation anticipating section to rule out a next operation, which is opposite or contradictory to the operation input to the input section and included in next operations subsequently executed after the operation input to the input section, as a next operation to be anticipated. It is also effective for the operation anticipating section to compare the automatically executed next operation with a new operation subsequently input to the input section, and reduce the likelihood that the next operation is to be anticipated if the automatically executed next operation and the new operation are opposite or contradictory to each other.

The information terminal device of the present invention may further comprise an operation detecting section for determining whether or not the operation input to the input section is a predetermined operation. In this structure, the operation anticipating section is operable to anticipate a next operation to be input by the user with respect only to an operation determined by the operation detecting section as a predetermined operation.

Also, the information terminal device of the present invention may further comprise an information managing section for managing special information about the operation input to the input section. In this structure, the operation history storing section is operable to store, as operation history information, information about the operation input to the input section along with the special information supplied from the information managing section, and the operation anticipating section is operable to anticipate a next operation to be input by the user, based on the operation history information, which includes the special information, stored in the operation history storing section. The special information may include a date, time and day of week when the operation was input to the input section, a user type, an area, and a traveling status.

On the other hand, the information terminal device of the present invention may cause an operation history storing process and an operation anticipating process to be performed by an external server. For example, the information terminal device of the present invention may be an information terminal device comprising: an input section for inputting an operation required by the user; a transmitting section for transmitting information about the operation input to the input section to the server as an operation history; a receiving section for receiving, from the server, information about a next operation anticipated by the server to be subsequently input by the user after the operation input to the input section, and an anticipated operation supporting section for supporting execution of a function corresponding to the next operation received by the receiving section.

Alternatively, the information terminal device of the present invention may cause operation history information to be written into a storage medium. For example, the information terminal device of the present invention may be an information terminal device comprising: an input section for inputting an operation required by the user; a storing section for storing, in the storage medium, information about the operation input to the input section, as an operation history; an obtaining section for obtaining operation history information stored in the storage medium when the operation is input to the input section; an operation anticipating section for anticipating a next operation to be subsequently input by the user after the operation input to the input section, based on the operation history information obtained by the obtaining section; and an anticipated operation supporting section for supporting execution of a function corresponding to the next operation anticipated by the operation anticipating section.

Processes respectively performed by the input section, the operation history storing section, the operation anticipating section, and the operation supporting section of the above information terminal device are able to be collectively considered as an operation supporting method providing a series of processes, that is, an operation supporting method performed by an information terminal device for inputting an operation required by the user, storing information about the input operation as an operation history in a predetermined storing section, anticipating a next operation to be subsequently input by the user after the input operation, based on operation history information stored in the storing section, when the operation required by the user is input, and supporting execution of a function corresponding to the anticipated next operation.

Preferably, the operation supporting method is provided as a program used for causing the information terminal device to execute the series of processes. The program may be stored in a computer-readable storage medium.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an exemplary operation input to an input section 11;

FIG. 4 is an illustration showing an example of statistical information generated from the operation history information stored in the operation history storing section 12;

FIG. 7 is an illustration showing exemplary concrete operations assigned to respective anticipation operations;

FIG. 10 is an illustration showing an example of operation history information stored in an operation history storing section 32;

FIG. 11 is an illustration showing an exemplary operation anticipation model generated by an operation anticipating section 33;

DESCRIPTION OF THE PREFERRED EMBODIMENTS

Hereinafter, embodiments of the present invention will be described with reference to FIGS. 1 to 13.

First Embodiment

Figure 1:
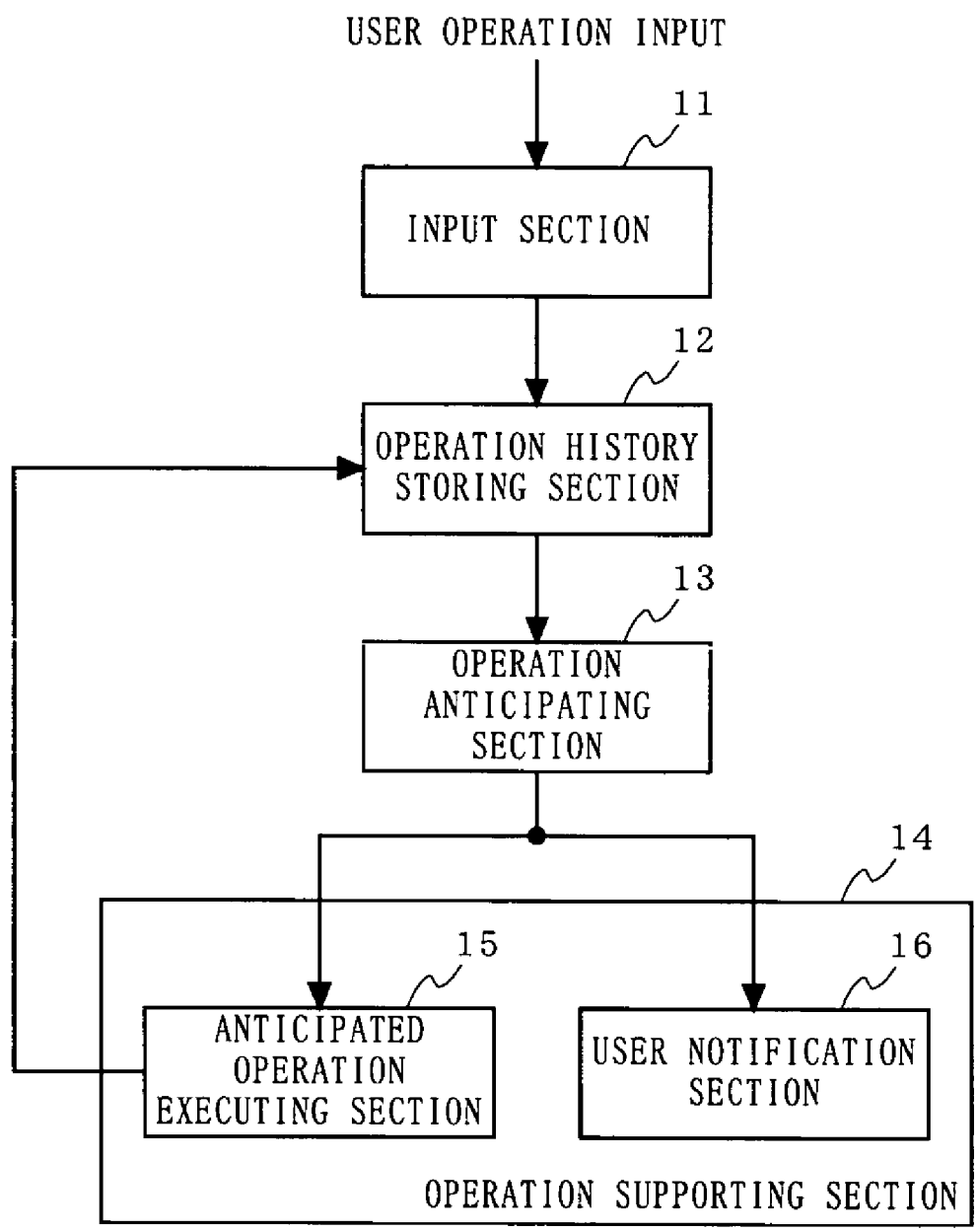
FIG. 1 is a block diagram showing the structure of an information terminal device according to a first embodiment of the present invention.

FIG. 1 is a block diagram showing the structure of an information terminal device according to a first embodiment of the present invention. In FIG. 1, the information terminal device according to the first embodiment includes an input section 11, an operation history storing section 12, an operation anticipating section 13, and an operation supporting section 14. The operation supporting section 14 includes an anticipated operation executing section 15 and a user notification section 16.

First, an outline of each component of the information terminal device according to the first embodiment will be described. The input section 11 inputs an operation required by a user, and notifies the operation history storing section 12 of the requested operation. The operation history storing section 12 stores, temporarily or for a long term, information about the input operation notified by the input section 11 as an operation history. Based on the operation history information stored in the operation history storing section 12, the operation anticipating section 13 anticipates a next operation likely to be executed by the user. The operation supporting section 14 supports execution of a function corresponding to the operation anticipated by the operation anticipating section 13. Typically, the operation supporting section 14 supports execution of the above function in either the anticipated operation executing section 15 or the user notification section 16. Note that, as shown in FIG. 1, the operation supporting section 14 may include the anticipated operation executing section 15 and the user notification section 16. In this case, function selection, for example, is performed for selecting either the anticipated operation executing section 15 or the user notification section 16, and only the selected section operates. The anticipated operation executing section 15 automatically executes the operation anticipated by the operation anticipating section 13. Information about the operation automatically executed by the anticipated operation executing section 15 is stored in the operation history information of the operation history storing section 12 in a format indicating that the operation is automatically executed. The user notification section 16 compares the operation anticipated by the operation anticipating section 13 and the next operation actually input by the user to the input section 11. If the user does not perform the anticipated operation, the user notification section 16 notifies the user that the anticipated operation is not performed.

Next, a detailed operation of the information terminal device according to the first embodiment having the above structure will be described.

The input section 11 is an interface for allowing the user to input an operation to be executed by the information terminal device, and corresponds to a ten-key numeric pad, buttons, or a jog dial, etc. Also, as the input section 11, a touch panel for designating an operation by touching a screen of the information terminal device, a voice recognition unit for recognizing a sound or a user's voice, or an image recognition unit for receiving and recognizing an image or video, for example, may be used. Furthermore, a unit for receiving a predetermined operation signal from another device by cable or radio transmission may be used as the input section 11.

An exemplary operation input to the input section 11 is shown in FIG. 2. A unique ID (operation ID) 201 is previously assigned to each concrete operation (function) 202 for uniquely identifying the operation. In FIG. 2, for example, "game01" is an operation ID for starting a game A, and "mannerOn" is an operation ID for setting a manner mode ON. Which operation ID 201 is assigned to which concrete operation 202 depends on the function of the information terminal device, and is not limited to the example shown in FIG. 2. Also, as long as each operation can be uniquely identified, it is not necessary to associate each operation ID 201 with a corresponding concrete operation 202 as shown in FIG. 2. When an operation is input to the input section 11, the operation history storing section 12 is notified of the operation ID corresponding to the operation.

Figure 3:
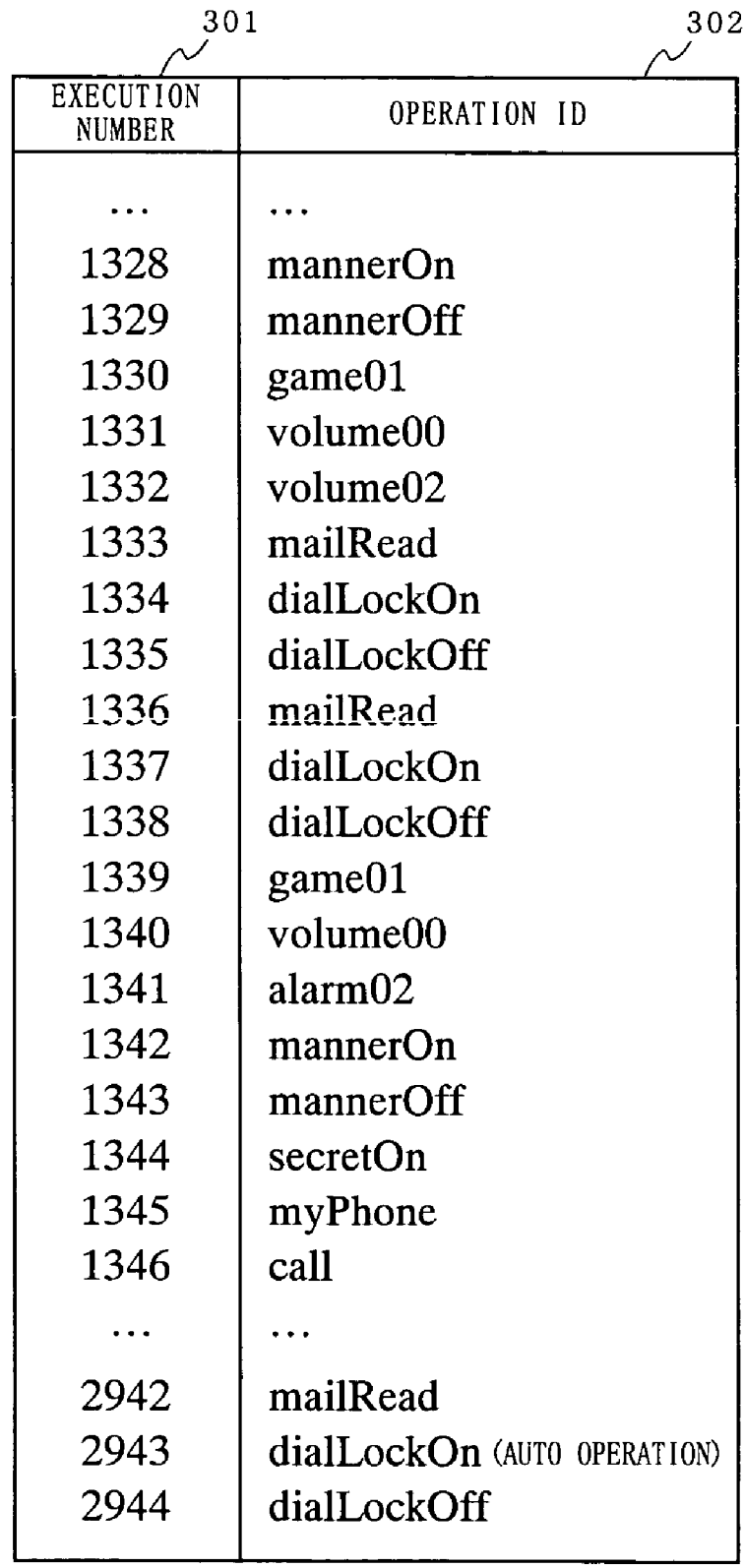
FIG. 3 is an illustration showing an example of operation history information stored in an operation history storing section 12.

The operation history storing section 12 receives information about the operation input to the input section 11, that is, the operation ID, and sequentially stores the received information in a predetermined storage area. Thus, in the operation history storing section 12, the history information of the operations executed by the information terminal device is stored in chronological order. Exemplary operation history information is shown in FIG. 3. In FIG. 3, an execution number 301 is a serial number for managing an order of the operation IDs 302 of the executed operations. Note that the execution number 301 is not necessarily needed if another system can manage the execution order of the operations. In the operation history information, information about the operation automatically executed by the anticipated operation executing section 15, which will be described below, is also stored as a history (in FIG. 3, referred to as auto operation). Note that the user is preferably allowed to delete all the operation history information stored by the operation history storing section 12. If the user is allowed to clear the old operation history information, new operation history information is stored in the operation history storing section 12. Thus, it is possible to anticipate a next operation based on the newly-stored operation history information. Also, whenever an operation ID about an operation input to the input section 11 is additionally stored in the operation history information, the operation history storing section 12 notifies the operation anticipating section 13 of the newly-stored operation ID.

The operation anticipating section 13 generates a predetermined operation anticipation model based on the operation history information stored in the operation history storing section 12. The operation anticipation model shows a probability that a certain operation is subsequently performed after the operation by the user. The probability is obtained based on the number (frequency) of earlier operations sequentially performed by the user. The operation anticipation model may be generated based on all the operation history information, or based on a portion of the operation history information (for example, the latest operation history information). The user can preferably select whether the operation anticipation model is generated based on all the operation history information or a portion thereof. Also, the operation anticipation model may be generated every time an operation is input to the input section 11, or may be updated periodically. The operation anticipation model can be generated by various methods, and an exemplary typical method will be described below. Note that, in the following descriptions, two operations sequentially operated by the user are referred to as "two consecutive operations", and three operations sequentially operated by the user are referred to as "three consecutive operations".

In order to generate the operation anticipation model, the operation anticipating section 13 first generates statistical information as shown in FIG. 4 from the operation history information stored in the operation history storing section 12. The statistical information shown in FIG. 4 is obtained by classifying the operation information in accordance with an item of operations performed by the user, and statistically describing the classified operation information. In FIG. 4, operations 401 include a category 411 of the total number of single operations, a category 412 of previous operations and presence/absence of automatic operations, a category 413 of single operation, and a category 414 of consecutive operations. The number of operations 402 shows the number of operations with respect to each item of the operations 401. The above statistical information can be analyzed as follows. The user executed 2944 operations so far, and operated "game01" 32 times. Among 32 executions of "game01", "game02" was executed twice after "game01", "volume00" was executed 28 times after "game01", and "mannerOn" was executed twice after "game01". Furthermore, among 28 executions of "volume00" after "game01", "mannerOn" was executed 10 times after "volume00", and "dialLockOn" was executed 8 times after "volume00". The above statistical information can be obtained from the operation history information shown in FIG. 3. Note that the statistical information may be generated by the operation anticipating section 13 as described above, or may be previously generated by the operation history storing section 12.

Figure 5:
FIG. 5 is an illustration showing an example of an operation anticipation model generated by an operation anticipating section 13.

The operation anticipating section 13 uses the above statistical information, and generates the operation anticipation model as shown in FIG. 5 from the operation history information. In FIG. 5, the operation anticipation model shows a probability value 502 of consecutive operations 501, which were consecutively performed by the user. In FIG. 5, a probability of execution of an operation x after an operation a, an operation b, ... and an operation n have been consecutively executed is represented by P (x|a b ... n). For example, P (game02|game01) represents a probability of execution of "game02" after "game01" was executed, and a probability value thereof is 0.0625. This probability value can be obtained, based on the number of operations 402 in the statistical information, by dividing the number of specific two consecutive operations by the total number of two consecutive operations including a certain operation. For example, if the number (=2) of operations in which "game02" was executed after "game01" is divided by the total number (=32) of two consecutive operations in which "game01" was first operated, the probability P (game02|game01)=0.0625 (=2/32) is obtained. As the operation anticipation model, it is not necessary to obtain probability values of all the consecutive operation models as shown in FIG. 5, and what is needed is to obtain, for each operation, only a consecutive operation model having the highest probability value.

The number of consecutive operations generated as the operation anticipation model can be arbitrarily set, but it depends on the number of consecutive operations used for anticipation by the operation anticipating section 13 in the following stage. The operation anticipating section 13 fixedly sets the number of consecutive operations used for anticipation, whereby the operation anticipation models whose number is equal to the set number of consecutive operations are basically sufficient. Note that the more the number of consecutive operations is increased, the more likely an operation desired by the user is anticipated. However, in a case where the number of operation history samples is small, the reliability of the probability value may be lowered. Also, the increased number of consecutive operations significantly increases the number of combinations of operations, thereby requiring an enormous storage capacity.

In a case where the operation history information stored in the operation history storing section 12 is not sufficient for generating the operation anticipation model, the operation anticipation model to be generated has a low degree of accuracy. Thus, when the operation history information stored in the operation history storing section 12 is not sufficient for generating the operation anticipation model, the operation anticipating section 13 preferably does not generate the operation anticipation model, or preferably does not anticipate a next operation even if the operation anticipation model has been generated. Hereinafter, a case where the operation history information is not sufficient will be described by two examples. A first example is a case where the total number of single operations (category 43) is smaller than a predetermined threshold value. The predetermined threshold value depends on the number of operation types or the number of consecutive operations used for estimating a probability. For example, in order to ensure that an operation b is executed after an operation a over 20 times on average in a case where there are ten types of operations and anticipation is performed based on three consecutive operations, the threshold value is 2000 (=10×10×20). A second example is a case where the number of consecutive operations immediately before anticipation of a next operation is smaller than a predetermined threshold value. For example, if a frequency that the operation b was executed after the operation a is smaller than a threshold value 20, the determination is made that it is insufficient for obtaining a probability. In this case, what is needed is not to generate the operation anticipation model with respect only to the consecutive operations whose frequency is determined to be insufficient for obtaining a probability.

Figure 6:
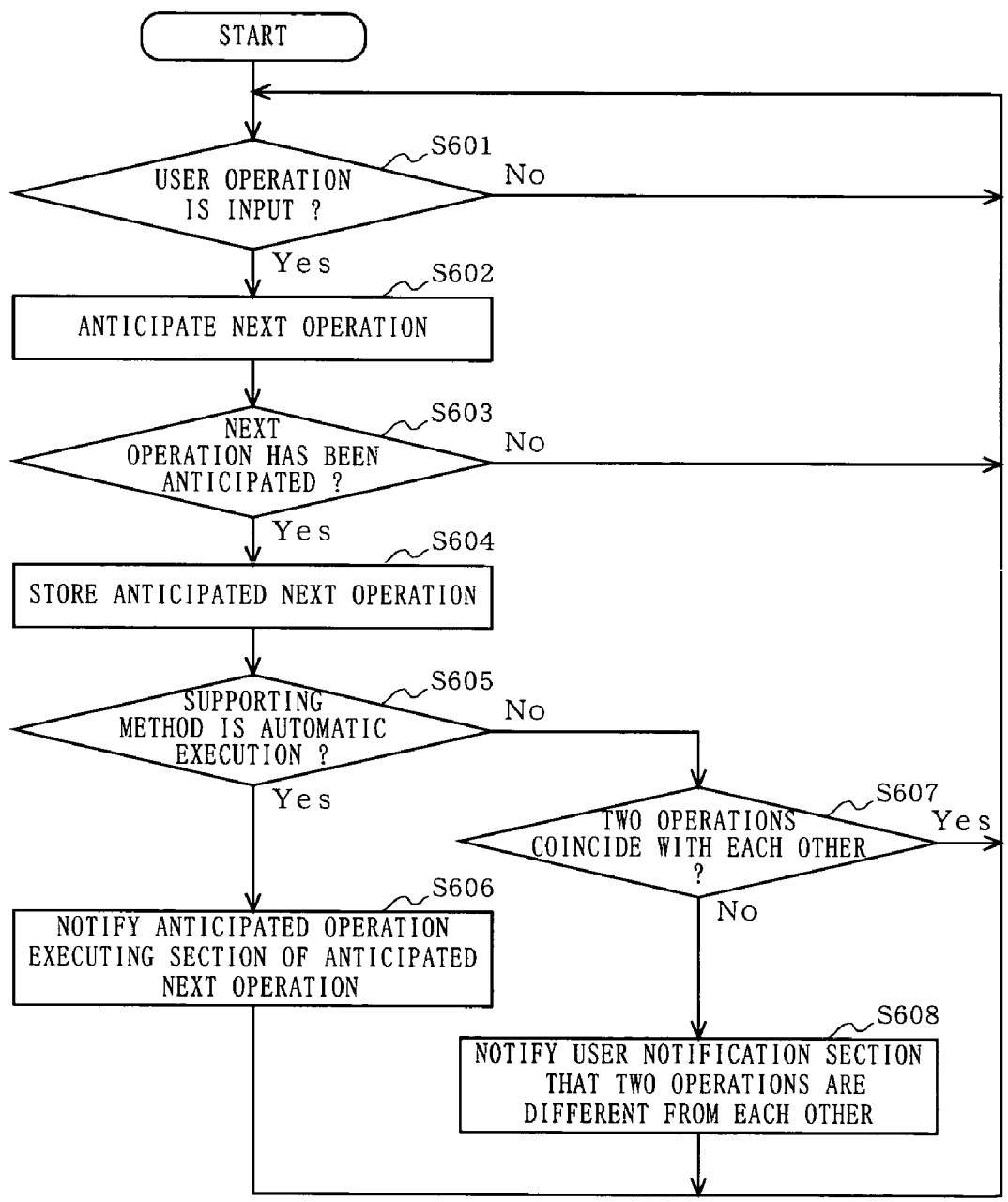
FIG. 6 is a flowchart showing a process performed by the operation anticipating section 13.

Next, with reference to FIG. 6, an operation anticipating process performed by the operation anticipating section 13 will be described. FIG. 6 is a flowchart showing a process performed by the operation anticipating section 13. The operation anticipating section 13 determines that a user operation has been newly input to the input section 11 by receiving a notification of an operation ID from the operation history storing section 12 (step S601). When a new operation x is input, the operation anticipating section 13 anticipates a next operation to be operated by the user after the operation x, based on the operation anticipation model generated as described above (step S602).

The above anticipation is performed based on the number of consecutive operations, which is previously set by the user, etc. In a case where a setting is made that a next operation is anticipated based on a probability of two consecutive operations, the operation anticipating section 13 anticipates, from among a plurality of probabilities P (?|x) (?represents any one operation) of the operation anticipation model, an operation y included in P (y|x) having the highest probability as a next operation to be operated by the user. In FIG. 4, if the operation x is "game01", for example, "volume00" is anticipated as a next operation to be operated by the user, based on P (volume00|game01) having the highest probability. Also, in a case where a setting is made that a next operation is anticipated based on a probability of three consecutive operations, the operation anticipating section 13 considers an operation w operated immediately before the operation x, and anticipates, among a plurality of probabilities P (?|w x) of the anticipation model, an operation z included in P (z|w x) having the highest probability as a next operation to be operated by the user. In FIG. 4, if the operation w is "game01" and the operation x is "volume00", for example, "mannerOn" is anticipated as a next operation to be operated by the user, based on P (mannerOn|game01 volume00) having the highest probability.

The operation anticipating section 13 temporarily stores the anticipated next operation (hereinafter, referred to as anticipated operation) (steps S603, S604). Note that, if the operation anticipating section 13 fails to anticipate the next operation, the operation anticipating section 13 goes back to step S601, and waits for a next operation by the user. After the anticipated operation is stored, the operation anticipating section 13 determines which supporting method is previously set by the user, etc. (step S605). In a case where the supporting method is automatic execution, the operation anticipating section 13 notifies the anticipated operation executing section 15 of an operation ID of the anticipated operation (step S606). In a case where the supporting method is a user notification, the operation anticipating section 13 compares the operation currently input by the user with the last anticipated operation, which has been anticipated based on the last operation input by the user and temporarily stored (step S607). If the two operations coincide with each other, the operation anticipating section 13 goes back to step S601, and waits for a next operation by the user. If the two operations do not coincide with each other, the operation anticipating section 13 notifies the user notification section 16 that the two operations do not coincide with each other (step S608).

The anticipated operation executing section 15 receives a notification of the operation ID of the anticipated operation from the operation anticipating section 13, and automatically executes an operation (function) corresponding to the received operation ID. The operation automatically executed in accordance with the anticipation is not limited to the operations previously assigned to the respective operation IDs in normal times as shown in FIG. 2. For example, as shown in FIG. 7, it is possible to arbitrarily assign different operations to the respective operation IDs. In the example shown in FIG. 7, the operation ID "mailSend" is assigned to a uniquely-defined operation "display mail sending form" in place of the originally-defined operation "start mailer and send mail". Also, the originally-defined operation "make a call" of the operation ID "call" is removed. By the above described change in the operations, it is possible to prevent, for example, a mail from being arbitrarily sent or a call from being arbitrarily made by automatic execution while the user is not intended to do such an operation. Note that, in a case where the originally-defined operation "make a call" of the operation ID "call" is removed, the operation can be anticipated based on the operation ID "call" but the operation has no content to be executed. Note that the operation anticipating section 13 may have the operation information as shown in FIG. 7. In this case, the operation anticipating section 13 notifies the anticipated operation executing section 15 of a uniquely-defined operation corresponding to the anticipated operation.

The user notification section 16 receives, from the operation anticipating section 13, the notification that the two operations do not coincide with each other, and notifies the user that the two operations do not coincide with each other. As a method to provide the notification to the user, for instance, the information terminal device may cause a loudspeaker to produce music, a sound, or an effective sound for appealing to the auditory sense of the user, or the information terminal device may cause its display screen to present a letter or an image thereon, or to emit light for appealing to user's vision. As a result, in a case where the user does not perform the operation anticipated by the operation anticipating section 13, it is possible to notify the user by voice or by a melody used as an alarm. Also, it is possible to display a message saying that a necessary operation may be not performed, or cause a character pre-selected by the user to give a warning. Furthermore, it is also possible to notify the user by vibration of the information terminal device, or send information by cable or radio transmission to another device if the information terminal device has a communication function.

Note that a function of the user notification section 16 is not limited to notifying the user of the operation anticipated by the operation anticipating section 13. The user notification section 16 can provide an environment in which the user can execute the operation immediately. For example, the information terminal device is ready to execute the anticipated operation when the user executes the anticipated operation after receiving the notification from the user notification section 16. Thus, what is needed to be performed by the user is to make a selection whether or not to execute the anticipated operation by performing an input with buttons or another input means.

As such, the information terminal device and the operation supporting method according to the first embodiment of the present invention anticipate a next operation to be subsequently performed by the user after the operation input by the user, based on the history of operations performed by the user. Thus, it is possible to realize an information terminal device whose functions are customized for the user of the device. Also, the anticipated operation is automatically executed, or the notification is provided to the user in a case where the anticipated operation does not coincide with the operation subsequently input by the user. Thus, it is possible to enhance operability of the operation input by the user.

When the operation anticipation model is generated by the operation anticipating section 13, it can be generated so that contradictory operations are not allowed to be consecutively operated. For example, it does not make sense to perform a key enabling operation after a key disabling operation. Thus, even if operation history information about the above consecutive operations is in the operation history storing section 12, the operation anticipating section 13 does not generate the operation anticipation model based on the above information. Furthermore, operations are classified by type for use in generating the operation history, whereby it is possible to generate an operation anticipation model of high precision even from small amounts of operation history information.

Furthermore, as described above, the operation automatically executed by the anticipated operation executing section 15 is also stored in the operation history storing section 12 as operation history information, thereby handling a case where an operation is automatically executed against the intention of the user. For example, there is a high possibility that the user immediately performs an operation opposite to the automatically executed operation in order to cancel the unintended operation. Thus, when the operation anticipation model is generated by the operation anticipating section 13, a method can be adopted, for example, for reducing the possibility of automatic execution by artificially reducing the statistics with respect to a history of the consecutive operations causing the automatic execution.

Second Embodiment

Figure 8:
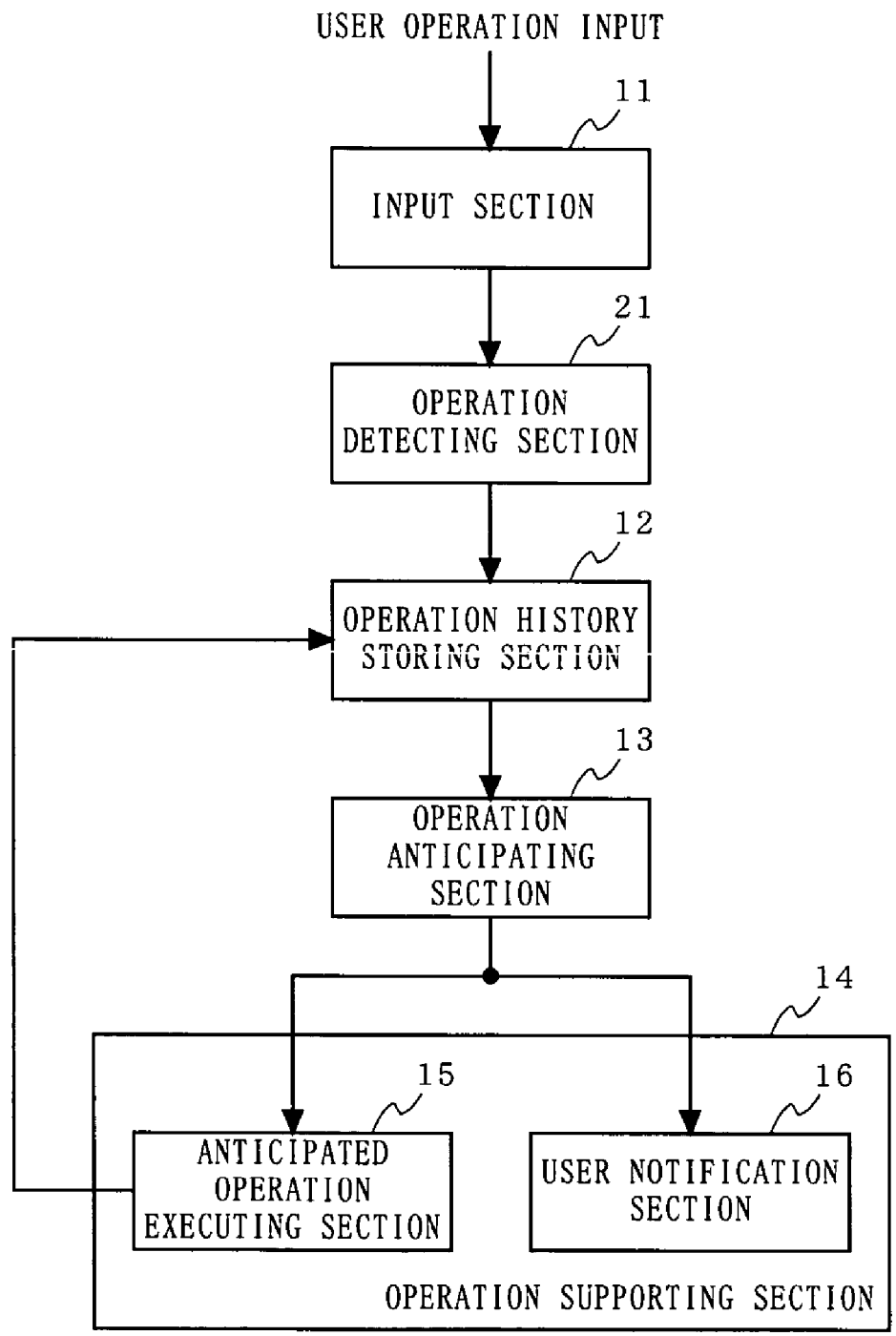
FIG. 8 is a block diagram showing the structure of an information terminal device according to a second embodiment of the present invention.

FIG. 8 is a block diagram showing the structure of an information terminal device according to a second embodiment of the present invention. In FIG. 8, the information terminal device according to the second embodiment includes the input section 11, an operation detecting section 21, the operation history storing section 12, the operation anticipating section 13, and the operation supporting section 14. The operation supporting section 14 includes the anticipated operation executing section 15 and the user notification section 16. As shown in FIG. 8, the information terminal device according to the second embodiment differs from the information terminal device according to the first embodiment in the structure of the operation detecting section 21. Hereinafter, the operation detecting section 21 will be mainly described in the following descriptions of the information terminal device according to the second embodiment.

The input section 11 inputs an operation required by the user, and notifies the operation detecting section 21 of the requested operation. The operation detecting section 21 notifies the operation history storing section 12 of only a specific operation, which is previously determined, among the operations notified by the input section 11. The above specific operation, which is notified to the operation history storing section 12 by the operation detecting section 21, is previously set by causing a developer or a user, etc., to select any desired operations from all the operations capable of being performed by the information terminal device. By setting the above specific operation, it is possible to perform operation anticipation with respect only to an operation relating to a setting or performance of the information terminal device, that is, an operation such as application start-up or a performance setting of the information terminal device (an operation which the information terminal device can perform and determine immediately after it is activated from a standby state). The operation history storing section 12 stores, temporarily or for a long term, the operation information notified by the operation detecting section 21 as an operation history.

As such, the information terminal device and the operation supporting method according to the second embodiment of the present invention allows operation anticipation to be performed with respect only to a specific operation. Thus, even if a processing capability of the information terminal device is restricted or even if a storage capacity of the operation history storing section 12 is restricted, for example, it is possible to perform operation anticipation of the present invention.

Third Embodiment

Figure 9:
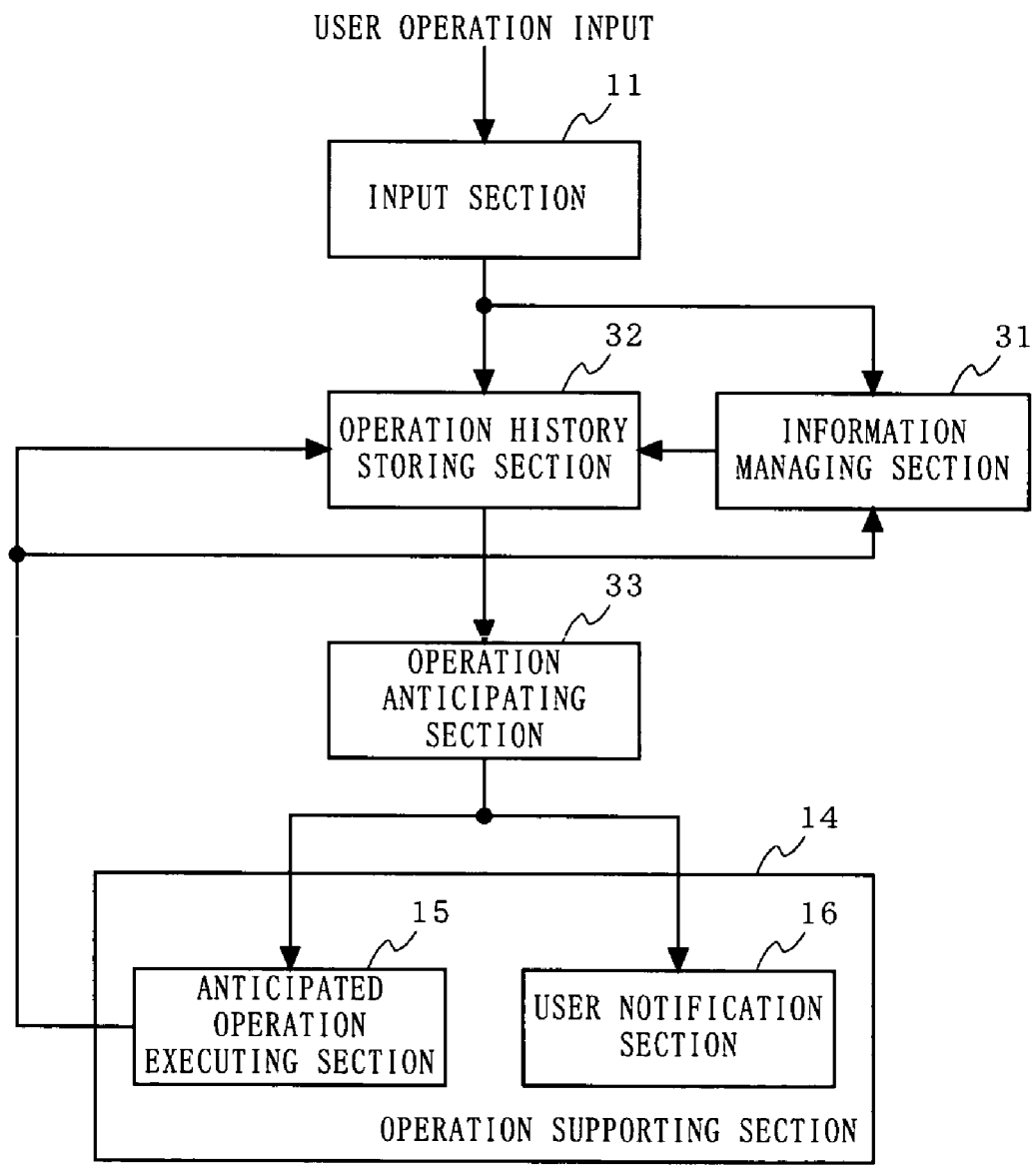
FIG. 9 is a block diagram showing the structure of an information terminal device according to a third embodiment of the present invention.

FIG. 9 is a block diagram showing the structure of an information terminal device according to a third embodiment of the present invention. In FIG. 9, the information terminal device according to the third embodiment includes the input section 11, an information managing section 31, an operation history storing section 32, an operation anticipating section 33, and the operation supporting section 14. The operation supporting section 14 includes the anticipated operation executing section 15 and the user notification section 16. As shown in FIG. 9, the information terminal device according to the third embodiment differs from the information terminal device according to the first embodiment in the information managing section 31, the operation history storing section 32, and the operation anticipating section 33. Hereinafter, the information managing section 31, the operation history storing section 32, and the operation anticipating section 33 will be mainly described in the following descriptions of the information terminal device according to the third embodiment.

The input section 11 inputs an operation required by the user, and notifies the information managing section 31 and the operation history storing section 32 of the requested operation. The information managing section 31 manages special information relating to operations, and notifies the operation history storing section 32 of the special information about the input operation notified by the input section 11. The above special information is, for example, a date, time, day of a week, a user type, an area, and a traveling status, etc., and any one of the information items or a combination thereof is used. The time information about a date, time, and day of a week is managed by utilizing a clock function (not shown), etc., built in the information terminal device. The information about a user type is managed by an identification number, etc., used when the user logs on the information terminal device. The information about an area and a traveling status is managed by utilizing a positioning function (not shown), etc., using a GPS built in the information terminal device. Also, the information managing section 31 has various data converting functions, such as a function for converting a Christian year to a traditional era used in a specific country, or a function for calculating a date and a day of the week based on a time elapsed from a reference time.

The operation history storing section 32 stores, temporarily or for a long term, the operation information input to the input section 11 and the special information notified by the information managing section 31, as an operation history. In FIG. 10, an example of operation history information using the time information, which is stored in the operation history storing section 32, is shown. In FIG. 10, a date of operation 1001 indicates information about a date when an operation has been executed. A day of week 1002 indicates information about a day of week when the operation was executed. A time 1003 indicates a time (hour: second: minute) when the operation was executed. Note that any data structure other than that shown in FIG. 10 may be used as long as each special information corresponds to an operation ID 1004.

The operation anticipating section 33 anticipates a next operation likely to be executed by the user, based on the operation history information stored in the operation history storing section 32. In order to anticipate a next operation, the operation anticipating section 33 generates a predetermined operation anticipation model based on the operation history information stored in the operation history storing section 32. A basic concept of the operation anticipation model has been described. However, the operation anticipating section 33 of the third embodiment differs from the operation anticipating section 13 of the first embodiment in several points, which will be described below.

First, the operation history storing section 12 of the first embodiment stores an operation history of operations consecutively performed without consideration of time intervals. For example, even when an operation is followed by another operation after the lapse of seven hours, those two operations are stored in the operation history storing section 12 as consecutive operations. As a result, in the first embodiment, there is a possibility that those unrelated two operations are determined as two consecutive operations, and an operation anticipation model is generated based thereon. In the third embodiment, however, time information is used for generating the operation anticipation model based only on related consecutive operations, thereby realizing operation anticipation with further precision. For example, in the third embodiment, "alarm02" executed on July 1, 22:25:30 and "mannerOn" executed on July 2, 09:01:58, which are shown in FIG. 10, are not determined as two consecutive operations. Note that a time interval over which the two operations are not determined as two consecutive operations is set in consideration of a desired precision, etc., of operation anticipation.

Also, some consecutive operations may be intensively executed by the user on certain times of day or a certain day of the week. However, the operation history storing section 12 of the first embodiment cannot determine which consecutive operations are intensively executed on certain times of day or a certain day of the week because the operation history information stored therein lacks time information. Thus, in the third embodiment, time information is used for generating an operation anticipation model whose consecutive operations are classified in consideration of a temporal relationship, thereby realizing operation anticipation with further precision. In FIG. 11, an exemplary operation anticipation model generated as described above is shown. In FIG. 11, among the operations executed after "game01", "volume00" has the highest probability value in a period of time from 22:00 through 18:00, and "mannerOn" has the highest probability value in a period of time from 18:00 through 22:00. Thus, in this case, the operation anticipating section 33 anticipates, as a next operation to be performed by the user, either "volume00" or "mannerOn" in accordance with a period of time when the user inputs an operation "game01".

As described above, in the information terminal device and the operation supporting method according to the third embodiment of the present invention, information about user's operations and special information about a time, etc., are stored as operation history information. Thus, an operation anticipation model can be generated in consideration of the special information, thereby realizing an information terminal device which is more suitable for a user's behavioral pattern than the information terminal device of the above first embodiment. Note that, also in the information terminal device according to the third embodiment, it is possible to realize the structure including the operation detecting section 21 described in the above second embodiment.

Fourth Embodiment

In the above first to third embodiments, a case where all the processes of storing the operation history information and anticipating a next operation are performed in the information terminal device has been described. However, those processes can be externally performed. Hereinafter, a fourth embodiment in which those processes are externally performed will be described.

Figure 12:
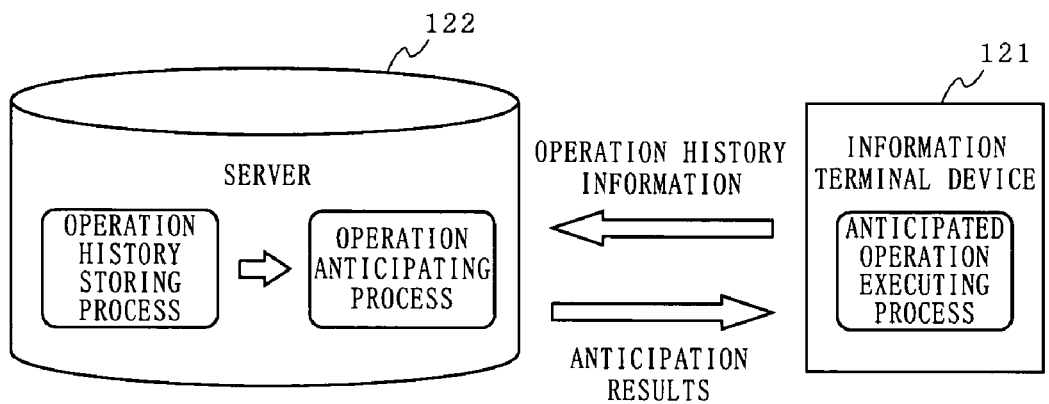
FIG. 12 is a schematic diagram of a communication system including an information terminal device according to a fourth embodiment of the present invention.

FIG. 12 is a schematic diagram of a communication system including an information terminal device according to the forth embodiment of the present invention. The communication system shown in FIG. 12 includes an information terminal device 121 and a server 122. The information terminal device 121 and the server 122 are connected to each other via a cable or radio transmission path. The information terminal device 121 includes the above-described input device, the operation supporting section (if necessary, the information managing section and/or the operation detecting section) and a transmitting/receiving section for performing data transmission/reception with the server 122 (above components are not shown). The server 122 includes the above-described operation history storing section, the operation anticipating section, and a transmitting/receiving section for performing data transmission/reception with the information terminal device 121 (above components are not shown).

Information about the operation input by the user is transmitted as data from the information terminal device 121 to the server 122. The server 122, which has a larger storage capacity than the information terminal device 121, can perform processing faster than the information terminal device 121. The server 122 stores the information about the input operation, which is received from the information terminal device 121, in a predetermined storage area. Then, the server 122 anticipates a next operation based on the stored information, and transmits the anticipation results to the information terminal device 121. The information terminal device 121 performs operation support for the anticipated operation based on the anticipation results received from the server 122.

Fifth Embodiment

Figure 13:
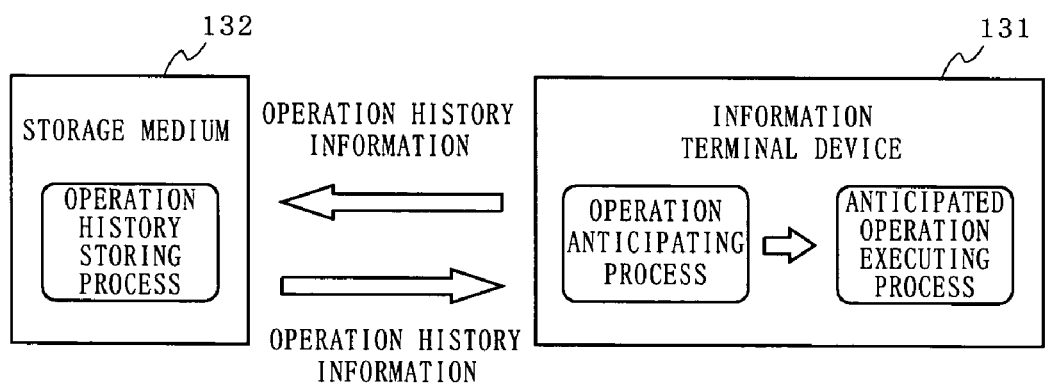
FIG. 13 is a schematic diagram of a communication system including an information terminal device according to a fifth embodiment of the present invention.

FIG. 13 is a schematic diagram of a communication system including an information terminal device according to a fifth embodiment of the present invention. The communication system shown in FIG. 13 includes an information terminal device 131 and a storage medium 132. The information terminal device 131 includes the above-described input section, the operation anticipating section, a portion of the operation history storing section, the operation supporting section (if necessary, the information managing section and/or the operation detecting section), and a drive for writing data into the storage medium 132 (above components are not shown). Note that the drive may be externally connected instead of being built into the information terminal device 131. The storage medium 132 is a medium (for example, an SD card) for storing the above-described operation history information.

The information about the operation input by the user to the information terminal device 131 is written into the storage medium 132 by the drive. When operation anticipation is performed, the information terminal device 131 reads the operation information from the storage medium 132, and anticipates a next operation based on the read information. Then, the information terminal device 131 performs operation support based on the anticipated operation.

As such, according to the information terminal devices and the operation supporting methods of the fourth and fifth embodiments of the present invention, it is possible to transmit data to the external component, which has a larger storage capacity and can perform processing faster than the information terminal device, for causing the external component to perform processing.

While the invention has been described in detail, the foregoing description is in all aspects illustrative and not restrictive. It is understood that numerous other modifications and variations can be devised without departing from the scope of the invention.

What is claimed is:

1. An information terminal device for executing, based on an operation input by a user, a function corresponding to the operation, comprising:

an input section for inputting an operation required by the user;

an operation history storing section for storing information about the operation input to the input section and about a time at which the operation is inputted as an operation history;

an operation anticipating section for anticipating, when the operation is input to the input section, a next operation to be subsequently input by the user from operations determined as consecutive operations in accordance with the time, based on the operation history information stored in the operation history information storing section; and an anticipated operation supporting section for comparing an actual next operation, which is newly input from the input section, after the operation anticipating section has anticipated the next operation, with the anticipated next operation, and providing the user with a notification indicating that the actual next operation does not coincide with the anticipated next operation when the anticipated next operation is different from the actual next operation, not providing the user with a notification to indicate that the actual next operation coincides with the anticipated next operation when the actual next operation is the same as the anticipated next operation, and reducing the possibility of automatic execution, wherein automatic execution occurs when the operation anticipating section notifies an anticipated operation executing section of an operation, by reducing statistics with respect to the history of the consecutive operations causing the automatic execution.

2. The information terminal device according to claim 1, wherein the operation history storing section stores the operation history information, which is operation information described in order of operations consecutively performed by the user.

3. The information terminal device according to claim 1, wherein the operation history storing section stores the operation history information, which is operation information classified in accordance with an item of operations consecutively performed by the user.

4. The information terminal device according to claim 2, wherein the operation anticipating section is further operable to calculate a frequency of a next operation subsequently operated after the operation previously input to the input section, based on the operation history information, and anticipate, based on the calculated frequency, a next operation having a highest probability of being subsequently executed, as a next operation to be input by the user.

5. The information terminal device according to claim 3, wherein the operation anticipating section is further operable to calculate a frequency of a next operation subsequently operated after the operation previously input to the input section, based on the operation history information, and anticipate, based on the calculated frequency, a next operation having a highest probability of being subsequently executed, as a next operation to be input by the user.

6. The information terminal device according to claim 4, wherein the operation anticipating section is operable to calculate the frequency from at least one operation subsequently executed before the operation input to the input section.

7. The information terminal device according to claim 5, wherein the operation anticipating section is operable to calculate the frequency from at least one operation subsequently executed before the operation input to the input section.

8. The information terminal device according to claim 4, wherein the operation anticipating section is operable to calculate the frequency based on the operation history information every time an operation is input to the input section.

9. The information terminal device according to claim 5, wherein the operation anticipating section is operable to calculate the frequency based on the operation history information every time an operation is input to the input section.

10. The information terminal device according to claim 4, wherein the user is allowed to select whether a most recent frequency or a previous frequency is used for anticipating a next operation.

11. The information terminal device according to claim 5, wherein the user is allowed to select whether a most recent frequency or a previous frequency is used for anticipating a next operation.

12. The information terminal device according to claim 4, wherein the operation anticipating section causes a next operation, which is opposite or contradictory to the operation input to the input section and included in next operations subsequently executed after the operation input to the input section, to be ruled out as a next operation to be anticipated.

13. The information terminal device according to claim 5, wherein the operation anticipating section causes a next operation, which is opposite or contradictory to the operation input to the input section and included in next operations subsequently executed after the operation input to the input section, to be ruled out as a next operation to be anticipated.

14. The information terminal device according to claim 1, further comprising an operation detecting section for determining whether or not the operation input to the input section is a predetermined operation, wherein
the operation anticipating section anticipates a next operation to be input by the user with respect only to an operation determined by the operation detecting section as a predetermined operation.

15. The information terminal device according to claim 1, further comprising an information managing section for managing special information about the operation input to the input section, wherein
the operation history storing section stores, as operation history information, information about the operation input to the input section along with the special information supplied from the information managing section, and
the operation anticipating section anticipates a next operation to be input by the user, based on the operation history information, which includes the special information, stored in the operation history storing section.

16. The information terminal device according to claim 15, wherein the special information includes at least any one of a date, and a day of a week when the operation was input to the input section, a user type, an area, and a traveling status.

17. An information terminal device for executing, based on an operation input by a user, a function corresponding to the operation, comprising:
an input section for inputting an operation required by the user;
a transmitting section for transmitting information about the operation input to the input section and about a time at which the operation is inputted to a server as an operation history;
a receiving section for receiving, from the server, information about a next operation anticipated by the server to be subsequently input by the user from operations determined as consecutive operations in accordance with the time the operations were inputted after the operation input to the input section; and
an anticipated operation supporting section for comparing an actual next operation, which is newly input from the input section after an operation anticipating section has anticipated the next operation, with the anticipated next operation, and providing the user with a notification indicating that the actual next operation does not coincide with the anticipated next operation when the anticipated next operation is different from the actual next operation, not providing the user with a notification to indicate that the actual next operation coincides with the anticipated next operation when the actual next operation is the same as the anticipated next operation, and reducing the possibility of automatic execution, wherein automatic execution occurs when the operation anticipating section notifies an anticipated operation executing section of an operation, by reducing statistics with respect to the history of the consecutive operations causing the automatic execution.

18. An information terminal device for executing, based on an operation input by a user, a function corresponding to the operation, comprising:
an input section for inputting an operation required by the user;

a storing section for storing, in a storage medium, information about the operation input to the input section and about a time at which the operation is inputted as an operation history;

an obtaining section for obtaining operation history information stored in the storage medium when the operation is input to the input section;

an operation anticipating section for anticipating a next operation to be subsequently input by the user from operations determined as consecutive operations in accordance with the time the operations were inputted after the operation input to the input section and based on the operation history information obtained by the obtaining section; and an anticipated operation supporting section for comparing an actual next operation, which is newly input from the input section after the operation anticipating section has anticipated the next operation, with the anticipated next operation, and providing the user with a notification indicating that the actual next operation does not coincide with the anticipated next operation when the anticipated next operation is different from the actual next operation, not providing the user with a notification to indicate that the actual next operation coincides with the anticipated next operation when the actual next operation is the same as the anticipated next operation, and reducing the possibility of automatic execution, wherein automatic execution occurs when the operation anticipating section notifies an anticipated operation executing section of an operation, by reducing statistics with respect to the history of the consecutive operations causing the automatic execution.

19. An operation supporting method performed by an information terminal device executing, based on an operation input by a user, a function corresponding to the operation, comprising at least the following:

inputting an operation required by the user;

storing information about the operation input at said inputting step, as an operation history, in a predetermined storing section;

anticipating a next operation to be subsequently input by the user from operations determined as consecutive operations in accordance with the time the operations were inputted after the input operation, based on operation history information stored in the storing section when the operation is input at said inputting step;

comparing an actual next operation, which is newly input after said anticipating step, with the anticipated next operation; and providing the user with a notification indicating that the actual next operation does not coincide with the anticipated next operation when the anticipated next operation is different from the actual next operation, not providing the user with a notification to indicate that the actual next operation coincides with the anticipated next operation when the actual next operation is the same as the anticipated next operation, and reducing the possibility of automatic execution, wherein automatic execution occurs when an operation anticipating section notifies an anticipated operation executing section of an operation, by reducing statistics with respect to the history of the consecutive operations causing the automatic execution.

20. A tangible computer readable medium having a program stored thereon to be executed by an information terminal device executing, based on an operation input by a user, a function corresponding to the operation, the program causing the information terminal device to execute the steps of:

inputting an operation required by the user;

storing information about the operation input at said inputting step, as an operation history, in a predetermined storing section;

anticipating a next operation to be subsequently input by the user from operations determined as consecutive operations in accordance with the time the operations were inputted after the input operation, based on operation history information stored in the storing section when the operation is input at said inputting step;

comparing an actual next operation, which is newly input after said anticipating step, with the anticipated next operation; and providing the user with a notification indicating that the actual next operation does not coincide with the anticipated next operation when the anticipated next operation is different from the actual next operation, not providing the user with a notification to indicate that the actual next operation coincides with the anticipated next operation when the actual next operation is the same as the anticipated next operation, and reducing the possibility of automatic execution, wherein automatic execution occurs when an operation anticipating section notifies an anticipated operation executing section of an operation, by reducing statistics with respect to the history of the consecutive operations causing the automatic execution.

* * * * *